United States Patent
Bally et al.

(10) Patent No.: US 10,232,797 B2
(45) Date of Patent: Mar. 19, 2019

(54) REAR VISION SYSTEM FOR VEHICLE WITH DUAL PURPOSE SIGNAL LINES

(71) Applicant: MAGNA ELECTRONICS INC., Auburn Hills, MI (US)

(72) Inventors: Nazar F. Bally, Sterling Heights, MI (US); Richard D. Shriner, Grand Blanc, MI (US); Patrick Miller, Grand Blanc, MI (US)

(73) Assignee: MAGNA ELECTRONICS INC., Auburn Hills, MI (US)

(*) Notice: Subject to any disclaimer, the term of this patent is extended or adjusted under 35 U.S.C. 154(b) by 800 days.

(21) Appl. No.: 14/264,443

(22) Filed: Apr. 29, 2014

(65) Prior Publication Data

US 2014/0320636 A1    Oct. 30, 2014

Related U.S. Application Data

(60) Provisional application No. 61/816,956, filed on Apr. 29, 2013.

(51) Int. Cl.
*B60R 1/00* (2006.01)
*H04N 7/18* (2006.01)
*B60R 11/04* (2006.01)

(52) U.S. Cl.
CPC .............. *B60R 11/04* (2013.01); *B60R 1/00* (2013.01); *H04N 7/181* (2013.01); *B60R 2300/408* (2013.01)

(58) Field of Classification Search
CPC ...... B60R 1/00; B60R 2300/408; H04N 7/181

USPC ......................................................... 348/113
See application file for complete search history.

(56) References Cited

U.S. PATENT DOCUMENTS

| | | | |
|---|---|---|---|
| 4,987,357 A | 1/1991 | Masaki |
| 4,991,054 A | 2/1991 | Walters |
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |

(Continued)

FOREIGN PATENT DOCUMENTS

| WO | WO2010144900 | 12/2010 |
| WO | WO2011028686 | 3/2011 |

(Continued)

*Primary Examiner* — David N Werner
(74) *Attorney, Agent, or Firm* — Honigman LLP (57) ABSTRACT

A vision system of a vehicle includes a camera disposed at a vehicle and having a field of view exterior of the vehicle. The camera is operable to capture image data. The camera includes a circuit board and an imager disposed at the circuit board. An image processor is disposed at the circuit board, which has circuitry disposed thereat. The image processor is operable to process image data captured by the camera. Signals to and from the image processor are provided on at least one shared line connected between an electrical connector of the camera and a vehicle control of the vehicle. The at least one shared line includes at least one combined camera control and camera programming line. Signals carried on the combined camera control and camera programming line (i) control operation of the camera and (ii) program the camera.

19 Claims, 2 Drawing Sheets

(56) References Cited

U.S. PATENT DOCUMENTS

| | | |
|---|---|---|
| 5,044,706 A | 9/1991 | Chen |
| 5,055,668 A | 10/1991 | French |
| 5,059,877 A | 10/1991 | Teder |
| 5,064,274 A | 11/1991 | Alten |
| 5,072,154 A | 12/1991 | Chen |
| 5,086,253 A | 2/1992 | Lawler |
| 5,096,287 A | 3/1992 | Kakinami et al. |
| 5,097,362 A | 3/1992 | Lynas |
| 5,121,200 A | 6/1992 | Choi |
| 5,124,549 A | 6/1992 | Michaels et al. |
| 5,130,709 A | 7/1992 | Toyama et al. |
| 5,168,378 A | 12/1992 | Black |
| 5,170,374 A | 12/1992 | Shimohigashi et al. |
| 5,172,235 A | 12/1992 | Wilm et al. |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,204,778 A | 4/1993 | Bechtel |
| 5,208,701 A | 5/1993 | Maeda |
| 5,245,422 A | 9/1993 | Borcherts et al. |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,498,866 A | 3/1996 | Bendicks et al. |
| 5,500,766 A | 3/1996 | Stonecypher |
| 5,510,983 A | 4/1996 | Iino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,555 A | 9/1996 | Sato et al. |
| 5,568,027 A | 10/1996 | Teder |
| 5,574,443 A | 11/1996 | Hsieh |
| 5,581,464 A | 12/1996 | Woll et al. |
| 5,594,222 A | 1/1997 | Caldwell |
| 5,614,788 A | 3/1997 | Mullins |
| 5,619,370 A | 4/1997 | Guinosso |
| 5,632,092 A | 5/1997 | Blank et al. |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,670,935 A | 9/1997 | Schofield et al. |
| 5,677,851 A | 10/1997 | Kingdon et al. |
| 5,699,044 A | 12/1997 | Van Lente et al. |
| 5,724,316 A | 3/1998 | Brunts |
| 5,732,379 A | 3/1998 | Eckert et al. |
| 5,737,226 A | 4/1998 | Olson et al. |
| 5,760,828 A | 6/1998 | Cortes |
| 5,760,931 A | 6/1998 | Saburi et al. |
| 5,761,094 A | 6/1998 | Olson et al. |
| 5,765,116 A | 6/1998 | Wilson-Jones et al. |
| 5,765,118 A | 6/1998 | Fukatani |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,835,255 A | 11/1998 | Miles |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,357 A | 3/1999 | Sivashankar et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,915,800 A | 6/1999 | Hiwatashi et al. |
| 5,923,027 A | 7/1999 | Stam et al. |
| 5,924,212 A | 7/1999 | Domanski |
| 5,949,331 A | 9/1999 | Schofield et al. |
| 5,959,555 A | 9/1999 | Furuta |
| 5,963,247 A | 10/1999 | Banitt |
| 5,986,796 A | 11/1999 | Miles |
| 5,990,469 A | 11/1999 | Bechtel et al. |
| 5,990,649 A | 11/1999 | Nagao et al. |
| 6,020,704 A | 2/2000 | Buschur |
| 6,049,171 A | 4/2000 | Stam et al. |
| 6,066,933 A | 5/2000 | Ponziana |
| 6,084,519 A | 7/2000 | Coulling et al. |
| 6,097,024 A | 8/2000 | Stam et al. |
| 6,100,799 A | 8/2000 | Fenk |
| 6,115,159 A | 9/2000 | Baker |
| 6,144,022 A | 11/2000 | Tenenbaum et al. |
| 6,175,300 B1 | 1/2001 | Kendrick |
| 6,178,034 B1 | 1/2001 | Allemand et al. |
| 6,201,642 B1 | 3/2001 | Bos et al. |
| 6,223,114 B1 | 4/2001 | Boros et al. |
| 6,227,689 B1 | 5/2001 | Miller |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,294,989 B1 | 9/2001 | Schofield et al. |
| 6,297,781 B1 | 10/2001 | Turnbull et al. |
| 6,310,611 B1 | 10/2001 | Caldwell |

(56) References Cited

U.S. PATENT DOCUMENTS

| | | |
|---|---|---|
| 6,317,057 B1 | 11/2001 | Lee |
| 6,320,282 B1 | 11/2001 | Caldwell |
| 6,333,759 B1 | 12/2001 | Mazzilli |
| 6,353,392 B1 | 3/2002 | Schofield et al. |
| 6,370,329 B1 | 4/2002 | Teuchert |
| 6,392,315 B1 | 5/2002 | Jones et al. |
| 6,396,397 B1 | 5/2002 | Bos et al. |
| 6,404,174 B1* | 6/2002 | Boudreaux, Jr. ..... H02M 3/155 323/273 |
| 6,411,204 B1 | 6/2002 | Bloomfield et al. |
| 6,424,273 B1 | 7/2002 | Gutta et al. |
| 6,430,303 B1 | 8/2002 | Naoi et al. |
| 6,442,465 B2 | 8/2002 | Breed et al. |
| 6,477,464 B2 | 11/2002 | McCarthy et al. |
| 6,497,503 B1 | 12/2002 | Dassanayake et al. |
| 6,498,620 B2 | 12/2002 | Schofield et al. |
| 6,534,884 B2 | 3/2003 | Marcus et al. |
| 6,539,306 B2 | 3/2003 | Turnbull |
| 6,547,133 B1 | 4/2003 | DeVries, Jr. et al. |
| 6,553,130 B1 | 4/2003 | Lemelson et al. |
| 6,574,033 B1 | 6/2003 | Chui et al. |
| 6,589,625 B1 | 7/2003 | Kothari et al. |
| 6,594,583 B2 | 7/2003 | Ogura et al. |
| 6,611,610 B1 | 8/2003 | Stam et al. |
| 6,636,258 B2 | 10/2003 | Strumolo |
| 6,650,455 B2 | 11/2003 | Miles |
| 6,672,731 B2 | 1/2004 | Schnell et al. |
| 6,674,562 B1 | 1/2004 | Miles |
| 6,680,792 B2 | 1/2004 | Miles |
| 6,690,268 B2 | 2/2004 | Schofield et al. |
| 6,700,605 B1 | 3/2004 | Toyoda et al. |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,735,506 B2 | 5/2004 | Breed et al. |
| 6,741,377 B2 | 5/2004 | Miles |
| 6,744,353 B2 | 6/2004 | Sjönell |
| 6,762,867 B2 | 7/2004 | Lippert et al. |
| 6,794,119 B2 | 9/2004 | Miles |
| 6,795,221 B1 | 9/2004 | Urey |
| 6,806,452 B2 | 10/2004 | Bos et al. |
| 6,819,231 B2 | 11/2004 | Berberich et al. |
| 6,823,241 B2 | 11/2004 | Shirato et al. |
| 6,824,281 B2 | 11/2004 | Schofield et al. |
| 6,850,156 B2 | 2/2005 | Bloomfield et al. |
| 6,889,161 B2 | 5/2005 | Winner et al. |
| 6,909,753 B2 | 6/2005 | Meehan et al. |
| 6,946,978 B2 | 9/2005 | Schofield |
| 6,975,775 B2 | 12/2005 | Rykowski et al. |
| 6,989,736 B2 | 1/2006 | Berberich et al. |
| 7,004,606 B2 | 2/2006 | Schofield |
| 7,038,577 B2 | 5/2006 | Pawlicki et al. |
| 7,062,300 B1 | 6/2006 | Kim |
| 7,065,432 B2 | 6/2006 | Moisel et al. |
| 7,079,017 B2 | 7/2006 | Lang et al. |
| 7,085,637 B2 | 8/2006 | Breed et al. |
| 7,092,548 B2 | 8/2006 | Laumeyer et al. |
| 7,111,968 B2 | 9/2006 | Bauer et al. |
| 7,116,246 B2 | 10/2006 | Winter et al. |
| 7,123,168 B2 | 10/2006 | Schofield |
| 7,136,753 B2 | 11/2006 | Samukawa et al. |
| 7,145,519 B2 | 12/2006 | Takahashi et al. |
| 7,149,613 B2 | 12/2006 | Stam et al. |
| 7,161,616 B1 | 1/2007 | Okamoto et al. |
| 7,195,381 B2 | 3/2007 | Lynam et al. |
| 7,202,776 B2 | 4/2007 | Breed |
| 7,227,611 B2 | 6/2007 | Hull et al. |
| 7,365,769 B1 | 4/2008 | Mager |
| 7,381,089 B2 | 6/2008 | Hosler, Sr. |
| 7,460,951 B2 | 12/2008 | Altan |
| 7,490,007 B2 | 2/2009 | Taylor et al. |
| 7,526,103 B2 | 4/2009 | Schofield et al. |
| 7,592,928 B2 | 9/2009 | Chinomi et al. |
| 7,639,149 B2 | 12/2009 | Katoh |
| 7,681,960 B2 | 3/2010 | Wanke et al. |
| 7,720,580 B2 | 5/2010 | Higgins-Luthman |
| 7,724,962 B2 | 5/2010 | Zhu et al. |
| 7,855,755 B2 | 12/2010 | Weller et al. |
| 7,881,496 B2 | 2/2011 | Camilleri et al. |
| 7,952,490 B2 | 5/2011 | Fechner et al. |
| 7,965,336 B2 | 6/2011 | Bingle et al. |
| 8,013,780 B2 | 9/2011 | Lynam et al. |
| 8,027,029 B2 | 9/2011 | Lu et al. |
| 8,849,495 B2 | 9/2014 | Chundrlik, Jr. et al. |
| 8,908,039 B2 | 12/2014 | De Wind |
| 9,126,525 B2 | 9/2015 | Lynam et al. |
| 9,210,307 B2 | 12/2015 | Gebauer et al. |
| 2002/0015153 A1 | 2/2002 | Downs |
| 2002/0113873 A1 | 8/2002 | Williams |
| 2002/0167589 A1 | 11/2002 | Schofield et al. |
| 2003/0103141 A1 | 6/2003 | Bechtel et al. |
| 2003/0137586 A1 | 7/2003 | Lewellen |
| 2003/0222982 A1 | 12/2003 | Hamdan et al. |
| 2004/0114381 A1 | 6/2004 | Salmeen et al. |
| 2005/0093975 A1* | 5/2005 | Hamdan ................ B60R 1/00 348/118 |
| 2005/0190261 A1* | 9/2005 | Hamdan ................ B60R 1/00 348/148 |
| 2005/0200467 A1 | 9/2005 | Au et al. |
| 2005/0209749 A1* | 9/2005 | Ito ........................ B60R 1/00 701/36 |
| 2006/0017807 A1 | 1/2006 | Lee et al. |
| 2006/0018511 A1 | 1/2006 | Stam et al. |
| 2006/0018512 A1 | 1/2006 | Stam et al. |
| 2006/0023105 A1 | 2/2006 | Kostrzewski et al. |
| 2006/0064208 A1* | 3/2006 | Lang .................... B60R 1/00 701/1 |
| 2006/0091813 A1 | 5/2006 | Stam et al. |
| 2006/0103727 A1 | 5/2006 | Tseng |
| 2006/0164221 A1 | 7/2006 | Jensen |
| 2006/0184297 A1 | 8/2006 | Higgins-Luthman |
| 2006/0206243 A1 | 9/2006 | Pawlicki et al. |
| 2006/0212624 A1 | 9/2006 | Kim |
| 2006/0250501 A1 | 11/2006 | Wildmann et al. |
| 2006/0254805 A1 | 11/2006 | Scherer et al. |
| 2006/0290479 A1 | 12/2006 | Akatsuka et al. |
| 2007/0104476 A1 | 5/2007 | Yasutomi et al. |
| 2007/0201860 A1* | 8/2007 | Schmid ................ B60R 1/00 396/419 |
| 2007/0206835 A1 | 9/2007 | Abe |
| 2007/0297784 A1 | 12/2007 | Wong et al. |
| 2008/0042812 A1 | 2/2008 | Dunsmoir et al. |
| 2009/0093938 A1 | 4/2009 | Isaji et al. |
| 2009/0113509 A1 | 4/2009 | Tseng et al. |
| 2009/0174765 A1 | 7/2009 | Namba et al. |
| 2009/0177347 A1 | 7/2009 | Breuer et al. |
| 2009/0195377 A1* | 8/2009 | Chang ................... B60R 1/00 340/461 |
| 2009/0237506 A1* | 9/2009 | Hubert ................ B60R 1/00 348/148 |
| 2009/0243824 A1 | 10/2009 | Peterson et al. |
| 2009/0244361 A1 | 10/2009 | Gebauer et al. |
| 2009/0265069 A1 | 10/2009 | Desbrunes |
| 2010/0002081 A1 | 1/2010 | Pawlicki et al. |
| 2010/0020170 A1 | 1/2010 | Higgins-Luthman et al. |
| 2010/0045799 A1 | 2/2010 | Lei et al. |
| 2010/0076621 A1 | 3/2010 | Kubotani et al. |
| 2010/0080538 A1* | 4/2010 | Inoue ................... H04N 5/765 386/241 |
| 2010/0228437 A1 | 9/2010 | Hanzawa et al. |
| 2011/0025489 A1 | 2/2011 | Shimoda et al. |
| 2011/0074916 A1 | 3/2011 | Demirdijian |
| 2011/0103650 A1 | 5/2011 | Cheng et al. |
| 2011/0286544 A1 | 11/2011 | Avudainayagam et al. |
| 2012/0044066 A1 | 2/2012 | Mauderer et al. |
| 2012/0062743 A1 | 3/2012 | Lynam et al. |
| 2012/0069184 A1* | 3/2012 | Hottmann ............ B60R 1/00 348/148 |
| 2012/0218412 A1 | 8/2012 | Dellantoni et al. |
| 2012/0262340 A1 | 10/2012 | Hassan et al. |

(56) References Cited

U.S. PATENT DOCUMENTS

| | | |
|---|---|---|
| 2012/0262578 A1* | 10/2012 | Weng .................. B60R 1/00 |
| | | 348/148 |
| 2013/0124052 A1 | 5/2013 | Hahne |
| 2013/0129150 A1 | 5/2013 | Saito |
| 2013/0131918 A1 | 5/2013 | Hahne |
| 2013/0187445 A1 | 7/2013 | Mutzabaugh |
| 2014/0067206 A1 | 3/2014 | Pflug |
| 2014/0156157 A1 | 6/2014 | Johnson et al. |
| 2014/0160291 A1 | 6/2014 | Schaffner |
| 2014/0176711 A1 | 6/2014 | Kirchner |
| 2014/0222280 A1 | 8/2014 | Salomonsson |
| 2014/0313339 A1 | 10/2014 | Diessner et al. |
| 2014/0362209 A1 | 12/2014 | Ziegenspeck et al. |
| 2014/0379233 A1 | 12/2014 | Chundrlik, Jr. et al. |
| 2015/0165909 A1* | 6/2015 | Saito .................. B60R 16/02 |
| | | 701/1 |

FOREIGN PATENT DOCUMENTS

| | | |
|---|---|---|
| WO | WO2010110957 | 9/2012 |
| WO | WO2013043661 | 3/2013 |
| WO | WO2013081985 | 6/2013 |

\* cited by examiner

FIG. 1

PRIOR ART

REAR VISION SYSTEM FOR VEHICLE WITH DUAL PURPOSE SIGNAL LINES

CROSS REFERENCE TO RELATED APPLICATION

The present application is related to U.S. provisional application, Ser. No. 61/816,956, filed Apr. 29, 2013, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935; and/or 5,550,677, which are hereby incorporated herein by reference in their entireties.

SUMMARY OF THE INVENTION

The present invention provides a collision avoidance system or vision system or imaging system for a vehicle that utilizes one or more cameras (preferably one or more CMOS cameras) to capture image data representative of images exterior of the vehicle, and provides shared lines that share control and program signals to and from the camera.

According to an aspect of the present invention, a vision system for a vehicle includes a camera disposed at the vehicle and having a field of view exterior of the vehicle, and an image processor operable to process image data captured by the camera. The signals to and from the image processor are provided on shared lines, such as first and second shared lines. For example, a first input control signal and a program clock signal are communicated along a first shared line, and a second input control signal and a program data signal are communicated along the second shared line.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
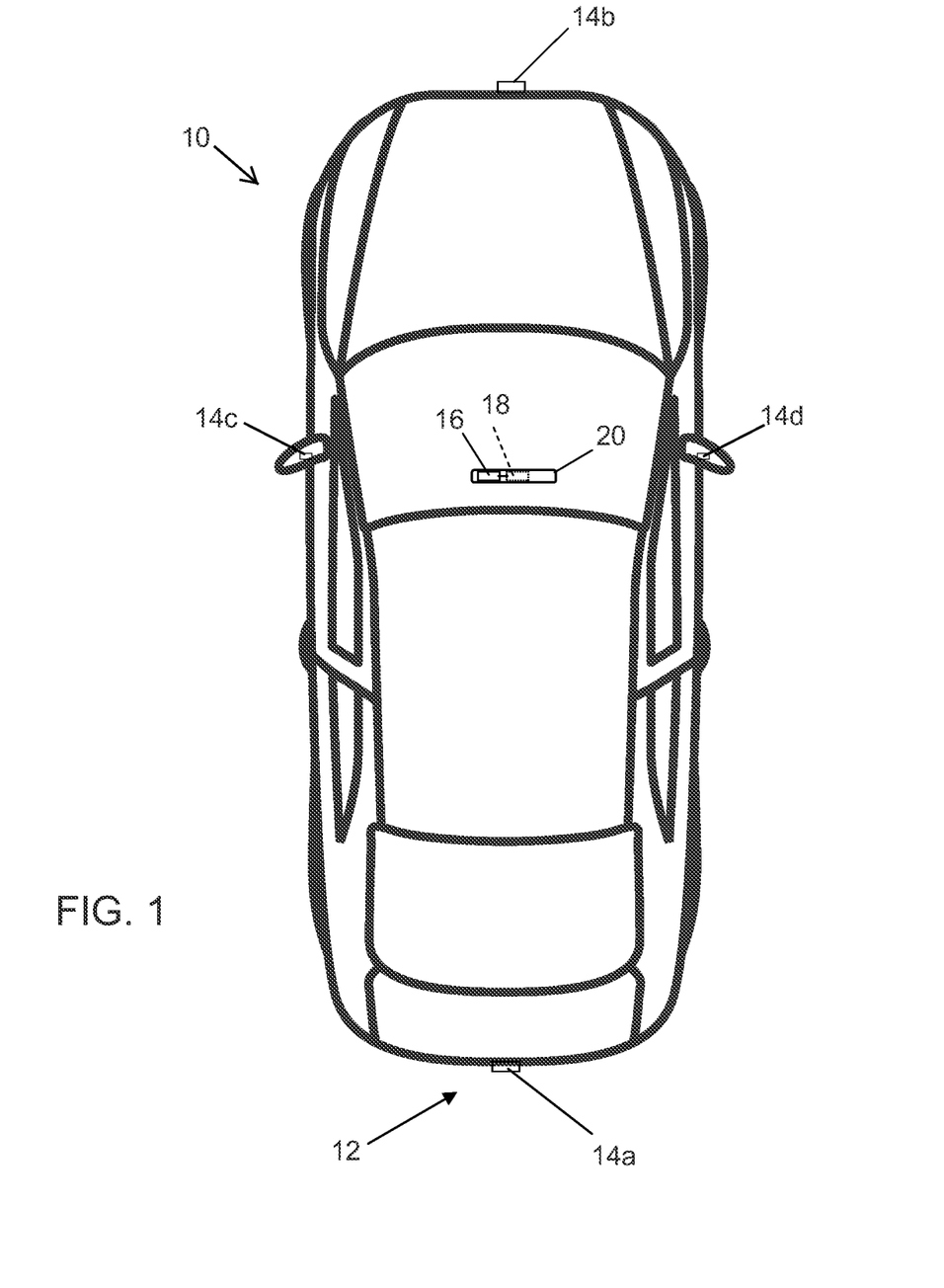
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle. The signal communication is made via shared lines or wires or cables, whereby some of the individual wires or lines are shared to provide different communications therealong (such as data transfer and/or control and/or programming or the like), as discussed below.

Cameras without a standard vehicle bus interface typically require some other method to externally control functionality. This is usually provided in the form of a serial interface or general purpose input/output (I/O) line. In the case of general purpose I/O lines, additional lines may be required to program the camera.

To reduce the overall size of the printed circuit board (PCB) and connector of the camera, as well as the associated cost and complexity, the general purpose I/O lines can be multiplexed programming lines.

Figure 2:
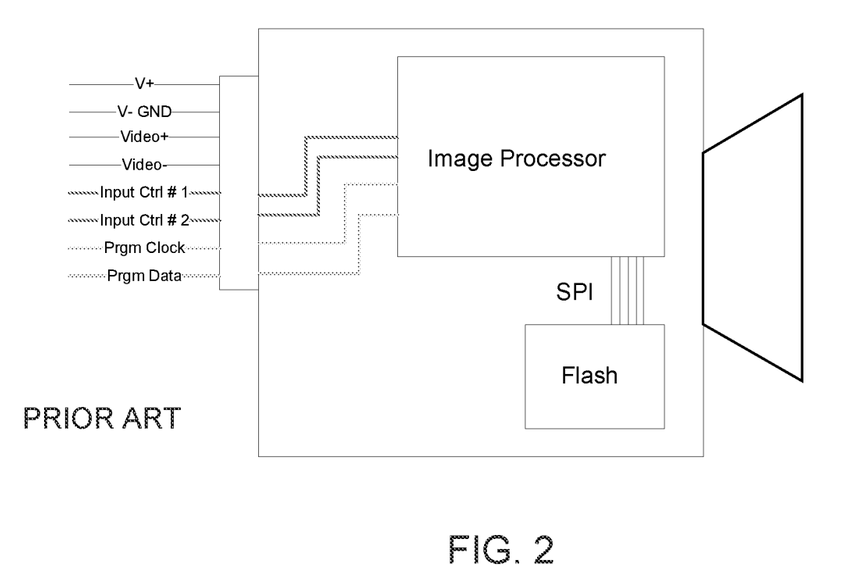
FIG. 2 is a schematic of a camera with individual programming and input/output lines.

As shown in FIG. 2, the current design practice includes two general purpose I/O (GPIO) lines are used to toggle between various camera features. The camera also uses two separate lines for programming the external Serial Peripheral Interface (SPI) flash device with different features. The two operating modes (normal and programming mode) are separate in this design. Thus, and as can be seen in FIG. 2, the camera receives a voltage+ line, a voltage- or ground line, a video+ line, a video- line, a first input control line, a second input control line, a program clock line and a program data line, with the input and program lines being fed to an image processor of the camera.

The present invention provides shared lines. For example, and with reference to FIG. 3, a camera (such as, for example, London/Miami-Lite ReversAid™ camera or the like) includes GPIO lines that are multiplexed with the programming lines. By increasing the external supply voltage beyond the normal operating range, the lines are enabled for programming rather than GPIO. Conversely, reducing the supply voltage to the normal operating range will enable the lines for GPIO rather than programming.

Figure 3:
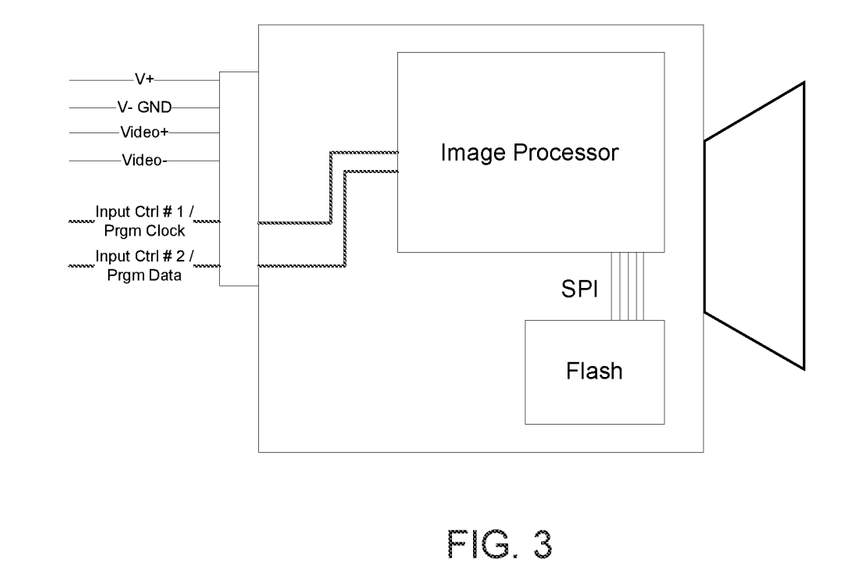
FIG. 3 is a schematic of a camera with shared programming and input/output lines.

Thus, and as can be seen in FIG. 3, the camera (which includes an imager or image sensing array and an image processor that processes image data captured by the imager) receives a voltage+ line, a voltage− or ground line, a video+ line, a video− line, a first shared line or combined control and programming line (shared by the first input control feed and the program clock feed) and a second shared line or combined control and programming line (shared by the second input control line and the program data line), with the shared lines being fed to or electrically connected with an image processor of the camera and with a control of the vehicle. Thus, for example, when the supply voltage is at or within its normal operating range, the shared lines may communicate first and second control lines or feeds or signals (such as to adjust or control various functions of the camera, such as pan or zoom or tilt of the camera or exposure or focus of the camera or the like), and when the supply voltage is increased beyond the normal operating range, the shared lines may communicate program clock and data feeds or lines or signals (such as for programming the camera, such as initial programming of the camera when the camera is installed at the vehicle to set the camera's settings at desired or selected levels or parameters for the particular vehicle at which the camera is installed and/or the particular application of the camera).

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580; and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/116043; WO 2012/145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661 and/or WO 2013/158592, and/or U.S. patent applications, Ser. No. 14/242,038, filed Apr. 1, 2014; Ser. No. 14/229,061, filed Mar. 28, 2014; Ser. No. 14/343,937, filed Mar. 10, 2014; Ser. No. 14/343,936, filed Mar. 10, 2014; Ser. No. 14/195,135, filed Mar. 3, 2014 P; Ser. No. 14/195,136, filed Mar. 3, 2014; Ser. No. 14/191,512, filed Feb. 27, 2014; Ser. No. 14/183,613, filed Feb. 19, 2014; Ser. No. 14/169,329, filed Jan. 31, 2014; Ser. No. 14/169,328, filed Jan. 31, 2014; Ser. No. 14/163,325, filed Jan. 24, 2014; Ser. No. 14/159,772, filed Jan. 21, 2014; Ser. No. 14/107,624, filed Dec. 16, 2013; Ser. No. 14/102,981, filed Dec. 11, 2013; Ser. No. 14/102,980, filed Dec. 11, 2013; Ser. No. 14/098,817, filed Dec. 6, 2013; Ser. No. 14/097,581, filed Dec. 5, 2013; Ser. No. 14/093,981, filed Dec. 2, 2013; Ser. No. 14/093,980, filed Dec. 2, 2013; Ser. No. 14/082,573, filed Nov. 18, 2013; Ser. No. 14/082,574, filed Nov. 18, 2013; Ser. No. 14/082,575, filed Nov. 18, 2013; Ser. No. 14/082,577, filed Nov. 18, 2013; Ser. No. 14/071,086, filed Nov. 4, 2013; Ser. No. 14/076,524, filed Nov. 11, 2013; Ser. No. 14/052,945, filed Oct. 14, 2013; Ser. No. 14/046,174, filed Oct. 4, 2013; Ser. No. 14/016,790, filed Oct. 3, 2013; Ser. No. 14/036,723, filed Sep. 25, 2013; Ser. No. 14/016,790, filed Sep. 3, 2013; Ser. No. 14/001,272, filed Aug. 23, 2013; Ser. No. 13/970,868, filed Aug. 20, 2013; Ser. No. 13/964,134, filed Aug. 12, 2013; Ser. No. 13/942,758, filed Jul. 16, 2013; Ser. No. 13/942,753, filed Jul. 16, 2013; Ser. No. 13/927,680, filed Jun. 26, 2013; Ser. No. 13/916,051, filed Jun. 12, 2013; Ser. No. 13/894,870, filed May 15, 2013; Ser. No. 13/887,724, filed May 6, 2013; Ser. No. 13/852,190, filed Mar. 28, 2013; Ser. No. 13/851,378, filed Mar. 27, 2013; Ser. No. 13/848,796, filed Mar. 22, 2013; Ser. No. 13/847,815, filed Mar. 20, 2013; Ser. No. 13/800,697, filed Mar. 13, 2013; Ser. No. 13/785,099, filed Mar. 5, 2013; Ser. No. 13/779,881, filed Feb. 28, 2013; Ser. No. 13/774,317, filed Feb. 22, 2013; Ser. No. 13/774,315, filed Feb. 22, 2013; Ser. No. 13/681,963, filed Nov. 20, 2012; Ser. No. 13/660,306, filed Oct. 25, 2012; Ser. No. 13/653,577, filed Oct. 17, 2012; and/or Ser. No. 13/534,657, filed Jun. 27, 2012 , and/or U.S. provisional applications, Ser. No. 61/972,708, filed Mar. 31, 2014; Ser. No. 61/972,707, filed Mar. 31, 2014; Ser. No. 61/969,474, filed Mar. 24, 2014; Ser. No. 61/955,831, filed Mar. 20, 2014; Ser. No. 61/952,335, filed Mar. 13, 2014; Ser. No. 61/952,334, filed Mar. 13, 2014; Ser. No. 61/950,261, filed Mar. 10, 2014; Ser. No. 61/950,261, filed Mar. 10, 2014; Ser. No. 61/947,638, filed Mar. 4, 2014; Ser. No. 61/947,053, filed Mar. 3, 2014; Ser. No. 61/942,568, filed Feb. 19, 2014; Ser. No. 61/935,485, filed Feb. 4, 2014; Ser. No. 61/935,057, filed Feb. 3, 2014; Ser. No. 61/935,056, filed Feb. 3, 2014; Ser. No. 61/935,055, filed Feb. 3, 2014; Ser. 61/931,811, filed Jan. 27, 2014; Ser. No. 61/919,129, filed Dec. 20, 2013; Ser. No. 61/919,130, filed Dec. 20, 2013; Ser. No. 61/919,131, filed Dec. 20, 2013; Ser. No. 61/919,147, filed Dec. 20, 2013; Ser. No. 61/919,138, filed Dec. 20, 2013, Ser. No. 61/919,133, filed Dec. 20, 2013; Ser. No. 61/918,290, filed Dec. 19, 2013; Ser. No. 61/915,218, filed Dec. 12, 2013; Ser. No. 61/912,146, filed Dec. 5, 2013; Ser. No. 61/911, 666, filed Dec. 4, 2013; Ser. No. 61/911,665, filed Dec. 4, 2013; Ser. No. 61/905,461, filed Nov. 18, 2013; Ser. No. 61/905,462, filed Nov. 18, 2013; Ser. No. 61/901,127, filed Nov. 7, 2013; Ser. No. 61/895,610, filed Oct. 25, 2013; Ser. No. 61/895,609, filed Oct. 25, 2013; Ser. No. 61/879,837, filed Sep. 19, 2013; Ser. No. 61/879,835, filed Sep. 19, 2013; Ser. No. 61/878,877, filed Sep. 17, 2013; Ser. No. 61/875,351, filed Sep. 9, 2013; Ser. No. 61/869,195, filed. Aug. 23, 2013; Ser. No. 61/864, 835, filed Aug. 12, 2013; Ser. No. 61/864,836, filed Aug. 12, 2013; Ser. No. 61/864,837, filed Aug. 12, 2013; Ser. No. 61/864,838, filed Aug. 12, 2013; Ser. No. 61/856,843, filed Jul. 22, 2013, Ser. No. 61/845,061, filed Jul. 11, 2013; Ser. No. 61/844,630, filed Jul. 10, 2013; Ser. No. 61/844,173, filed Jul. 9, 2013; Ser. No. 61/844,171, filed Jul. 9, 2013; Ser. No. 61/842,644, filed Jul. 3, 2013; Ser. No. 61/840,542, filed Jun. 28, 2013; Ser. No. 61/838,619, filed Jun. 24, 2013; Ser. No. 61/838,621, filed Jun. 24, 2013; Ser. No. 61/837,955, filed Jun. 21, 2013; Ser. No. 61/836,900, filed Jun. 19, 2013; Ser. No. 61/836,380, filed Jun. 18, 2013; Ser. No. 61/833,080, filed Jun. 10, 2013; Ser. No. 61/830,375, filed Jun. 3, 2013; Ser. No. 61/830,377, filed Jun. 3, 2013; Ser. No. 61/825,752, filed May 21, 2013; Ser. No. 61/825,753, filed May 21, 2013; Ser. No. 61/823,648, filed May 15, 2013; Ser. No. 61/823,644, filed May 15, 2013; Ser. No. 61/821,922, filed May 10, 2013; Ser. No. 61/819,835, filed May 6, 2013; Ser. No. 61/819,033, filed May 3, 2013; Ser. No. 61/815,044, filed Apr. 23, 2013; Ser. No. 61/814,533, filed Apr. 22, 2013; Ser. No. 61/813,361, filed Apr. 18, 2013; and/or Ser. No. 61/810,407, filed Apr. 10, 2013; which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. patent application Ser. No. 13/202,005, filed Aug. 17, 2011 , which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454; and/or 6,824,281, and/or International Publication Nos. WO 2010/099416; WO 2011/028686; and/or WO 2013/016409, and/or U.S. Pat. Publication No. US 2010-0020170, and/or U.S. patent application Ser. No. 13/534,657, filed Jun. 27, 2012, which are all hereby incorporated herein by reference in their entireties. The camera or cameras may comprise any suitable cameras or imaging sensors or camera modules, and may utilize aspects of the cameras or sensors described in U.S. Publication No. US-2009-0244361 and/or U.S. patent application Ser. No. 13/260,400, filed Sep. 26, 2011 , and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760, 962; 5,715,093; 5,877,897; 6,922,292; 6,757,109; 6,717, 610; 6,590,719; 6,201,642; 6,498,620; 5,796,094; 6,097, 023; 6,320,176; 6,559,435; 6,831,261; 6,806,452; 6,396, 397; 6,822,563; 6,946,978; 7,339,149; 7,038,577; 7,004, 606; 7,720,580; and/or 7,965,336, and/or International Publication Nos. WO/2009/036176 and/or WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149; and/or 7,526,103, which are all hereby incorporated herein by reference in their entireties, a rain sensor, such as the types disclosed in commonly assigned U.S. Pat. Nos. 6,353,392; 6,313,454; 6,320,176; and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877, 897; 5,949,331; 6,222,447; 6,302,545; 6,396,397; 6,498, 620; 6,523,964; 6,611,202; 6,201,642; 6,690,268; 6,717, 610; 6,757,109; 6,802,617; 6,806,452; 6,822,563; 6,891, 563; 6,946,978; and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,720,580; 7,038,577; 5,929,786 and/or 5,786,772, and/or U.S. patent applications, Ser. No. 11/239,980, filed Sep. 30, 2005, now U.S. Pat. No. 7,881,496, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268; and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149; and/or U.S. Publication No. US-2006-0061008 and/or U.S. patent application Ser. No. 12/578,732, filed Oct. 14, 2009 , which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011 , which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252; and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO2012/075250; WO 2013/019795; WO 2012/075250; WO 2012/145822; WO 2013/081985; WO 2013/086249; and/or WO 2013/109869, and/or U.S. patent application Ser. No. 13/333,337, filed Dec. 21, 2011 , which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. Publication Nos. US-2006-0061008 and/or US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036; and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742; and/or 6,124,886, and/or U.S. Publication No. US-2006-0050018, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vision system of a vehicle, said vision system comprising:
 a camera disposed at a vehicle and having a field of view exterior of the vehicle, wherein said camera is operable to capture image data;
 wherein said camera comprises a circuit board and an imager disposed at said circuit board, wherein said imager comprises a two-dimensional photosensor array of photosensing pixels;
 an image processor disposed at said circuit board of said camera, wherein said circuit board has circuitry disposed thereat;
 wherein said image processor is operable to process image data captured by said camera;
 wherein signals to and from said image processor are provided on at least one shared line connected between an electrical connector of said camera and a vehicle control of the vehicle;
 wherein said at least one shared line comprises at least one combined camera control and camera programming line, and wherein signals carried on said combined camera control and camera programming line (i) control operation of said camera and (ii) program said camera; and wherein an external supply voltage level is adjusted to adjust the signals that are communicated along said at least one combined camera control and camera programming line.

2. The vision system of claim 1, wherein said at least one shared line comprise first and second combined camera control and camera programming lines.

3. The vision system of claim 2, wherein a first input control signal for controlling operation of said camera and a program clock signal for programming said camera are communicated along said first combined camera control and camera programming line.

4. The vision system of claim 3, wherein a second input control signal for controlling operation of said camera and a program data signal for programming said camera are communicated along said second combined camera control and camera programming line.

5. The vision system of claim 1; wherein, responsive to an increased supply voltage level, said first and second combined camera control and camera programming lines communicate said program clock signal and said program data signal, respectively.

6. The vision system of claim 5, wherein, responsive to a decreased supply voltage level, said first and second combined camera control and camera programming lines communicate said first and second input control signals, respectively.

7. The vision system of claim 5, wherein said increased supply voltage level comprises a supply voltage level that is above an operating voltage level of said camera.

8. The vision system of claim 4, wherein said first and second input control signals control at least one of (i) focus of the camera, (ii) zoom of the camera, (iii) exposure of the camera, (iv) tilt of the camera.

9. The vision system of claim 4, wherein said program clock signal and said program data signal program an external Serial Peripheral Interface flash device of said camera with different features.

10. The vision system of claim 1, wherein an input control signal for controlling operation of said camera and a program signal for programming said camera are communicated along said at least one combined camera control and camera programming line.

11. The vision system of claim 10, wherein a supply voltage level is adjusted to adjust the signal that is communicated along said at least one combined camera control and camera programming line.

12. The vision system of claim 11, wherein, responsive to an increased supply voltage level, said at least one combined camera control and camera programming line communicates said program signal, and wherein, responsive to a decreased supply voltage level, said at least one combined camera control and camera programming line communicates said input control signal.

13. The vision system of claim 12, wherein said increased supply voltage level comprises a supply voltage level that is above an operating voltage level of said camera.

14. A vision system of a vehicle, said vision system comprising:

a camera disposed at a vehicle and having a field of view exterior of the vehicle, wherein said camera is operable to capture image data;

wherein said camera comprises a circuit board and an imager disposed at said circuit board, wherein said imager comprises a two-dimensional photosensor array of photosensing pixels;

an image processor disposed at said circuit board of said camera, wherein said circuit board has circuitry disposed thereat;

wherein said image processor is operable to process image data captured by said camera;

wherein signals to and from said image processor are provided on first and second shared lines connected between an electrical connector of said camera and a vehicle control of the vehicle; and wherein said first shared line comprises a first combined camera control and camera programming line, and wherein signals carried on said first combined camera control and camera programming line (i) control operation of said camera and (ii) program said camera, and wherein said signals carried on said first combined camera control and camera programming line comprise (a) a first input control signal for controlling operation of said camera and (b) a program clock signal for programming said camera;

wherein said second shared line comprises a second combined camera control and camera programming line, and wherein signals carried on said second combined camera control and camera programming line (i) control operation of said camera and (ii) program said camera, and wherein said signals carried on said second combined camera control and camera programming line comprise (a) a second input control signal for controlling operation of said camera and (b) a program data signal for programming said camera; and wherein an external supply voltage level is adjusted to adjust the signals that are communicated along said first and second combined camera control and camera programming lines.

15. The vision system of claim 14, wherein, responsive to an increased supply voltage level, said first and second combined camera control and camera programming lines communicate said program clock signal and said program data signal, respectively, and wherein, responsive to a decreased supply voltage level, said first and second combined camera control and camera programming lines communicate said first and second input control signals, respectively.

16. The vision system of claim 15, wherein said increased supply voltage level comprises a supply voltage level that is above an operating voltage level of said camera.

17. The vision system of claim 14, wherein said first and second input control signals control at least one of (i) focus of the camera, (ii) zoom of the camera, (iii) exposure of the camera, (iv) tilt of the camera.

18. A vision system of a vehicle, said vision system comprising:

a camera disposed at a vehicle and having a field of view exterior of the vehicle, wherein said camera is operable to capture image data;

wherein said camera comprises a circuit board and an imager disposed at said circuit board, wherein said imager comprises a two-dimensional photosensor array of photosensing pixels;

an image processor disposed at said circuit board of said camera, wherein said circuit board has circuitry disposed thereat;

wherein said image processor is operable to process image data captured by said camera;

wherein signals to and from said image processor are provided on shared lines connected between an electrical connector of said camera and a vehicle control of the vehicle;

wherein said shared lines comprise at least two combined camera control and camera programming lines, and wherein signals carried on said combined camera control and camera programming lines comprise (i) control signals that control operation of said camera and (ii) program signals that program said camera;

wherein an external supply voltage level is adjusted to adjust the signals that are communicated along said combined camera control and camera programming lines;

wherein, responsive to an increased external supply voltage level, said combined camera control and camera programming lines communicate said program signals, and wherein, responsive to a decreased external supply voltage level, said combined camera control and camera programming lines communicate said input control signals; and wherein said increased external supply voltage level comprises an external supply voltage level that is above an operating voltage level of said camera.

19. The vision system of claim 18, wherein control signals for controlling operation of said camera and a program clock signal for programming said camera are communicated along one of said combined camera control and camera programming lines and wherein control signals for controlling operation of said camera and a program data signal for programming said camera are communicated along another of said combined camera control and camera programming lines.

* * * * *